(12) United States Patent
Hagiuda et al.

(10) Patent No.: US 7,970,817 B2
(45) Date of Patent: Jun. 28, 2011

(54) INFORMATION PROCESSING DEVICE, INFORMATION PROCESSING METHOD, AND CONTROL PROGRAM

(75) Inventors: Tadashi Hagiuda, Yokohama (JP); Masao Hayashi, Yokohama (JP); Kentaro Saito, Kawasaki (JP); Yoichi Takaragi, Yokohama (JP); Akio Ito, Yokohama (JP); Kazuhiro Sakaguchi, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 1019 days.

(21) Appl. No.: 11/123,953

(22) Filed: May 6, 2005

(65) Prior Publication Data

US 2005/0257126 A1  Nov. 17, 2005

(30) Foreign Application Priority Data

May 11, 2004  (JP) ................................. 2004-141491

(51) Int. Cl.
 *G06F 15/16* (2006.01)

(52) U.S. Cl. ...................................................... 709/203

(58) Field of Classification Search .................. 358/1.15, 358/402, 1.14, 468, 1.13, 1.6, 1.16, 1.18; 709/203, 232; 235/462.01, 375, 472.01; 705/1; 707/E17.116
See application file for complete search history.

(56) References Cited

U.S. PATENT DOCUMENTS

| | | | | |
|---|---|---|---|---|
| 6,970,263 B2 * | 11/2005 | Suzuki et al. | ................ | 358/1.15 |
| 6,987,580 B2 * | 1/2006 | Watanabe et al. | ............ | 358/1.15 |
| 7,113,300 B2 * | 9/2006 | Strobel et al. | ................ | 358/1.15 |
| 7,315,404 B2 * | 1/2008 | Kimura | ......................... | 358/406 |
| 7,337,472 B2 * | 2/2008 | Olsen et al. | ...................... | 726/26 |
| 7,382,405 B2 * | 6/2008 | Kusaka et al. | ............. | 348/231.6 |
| 7,391,526 B2 | 6/2008 | Nishimura | | |
| 7,474,423 B2 * | 1/2009 | Garcia et al. | ................ | 358/1.15 |
| 2002/0120875 A1 | 8/2002 | Kiwada | | |

FOREIGN PATENT DOCUMENTS

| | | |
|---|---|---|
| JP | 2001-312446 A | 11/2001 |
| JP | 2002-055927 A | 2/2002 |
| JP | 2002-204345 A | 7/2002 |
| JP | 2002-251356 A | 9/2002 |

* cited by examiner

*Primary Examiner* — Jeffrey Pwu
*Assistant Examiner* — Saad A Waqas
(74) *Attorney, Agent, or Firm* — Canon USA, Inc. IP Division

(57) ABSTRACT

An information processing method includes a storing step of storing a correspondence between destination names and e-mail addresses in a storage unit; a setting step of setting a destination name to which a document is to be transmitted; and an upload step of uploading the document to a document management server for a network printing in accordance with an e-mail address corresponding to the set destination name, a document being uploaded to the document management server and then being output in response to an output request from an owner of the e-mail address in the network printing. The uploaded document can be downloaded from the document management server to a printer through a communication medium and can be printed.

8 Claims, 9 Drawing Sheets

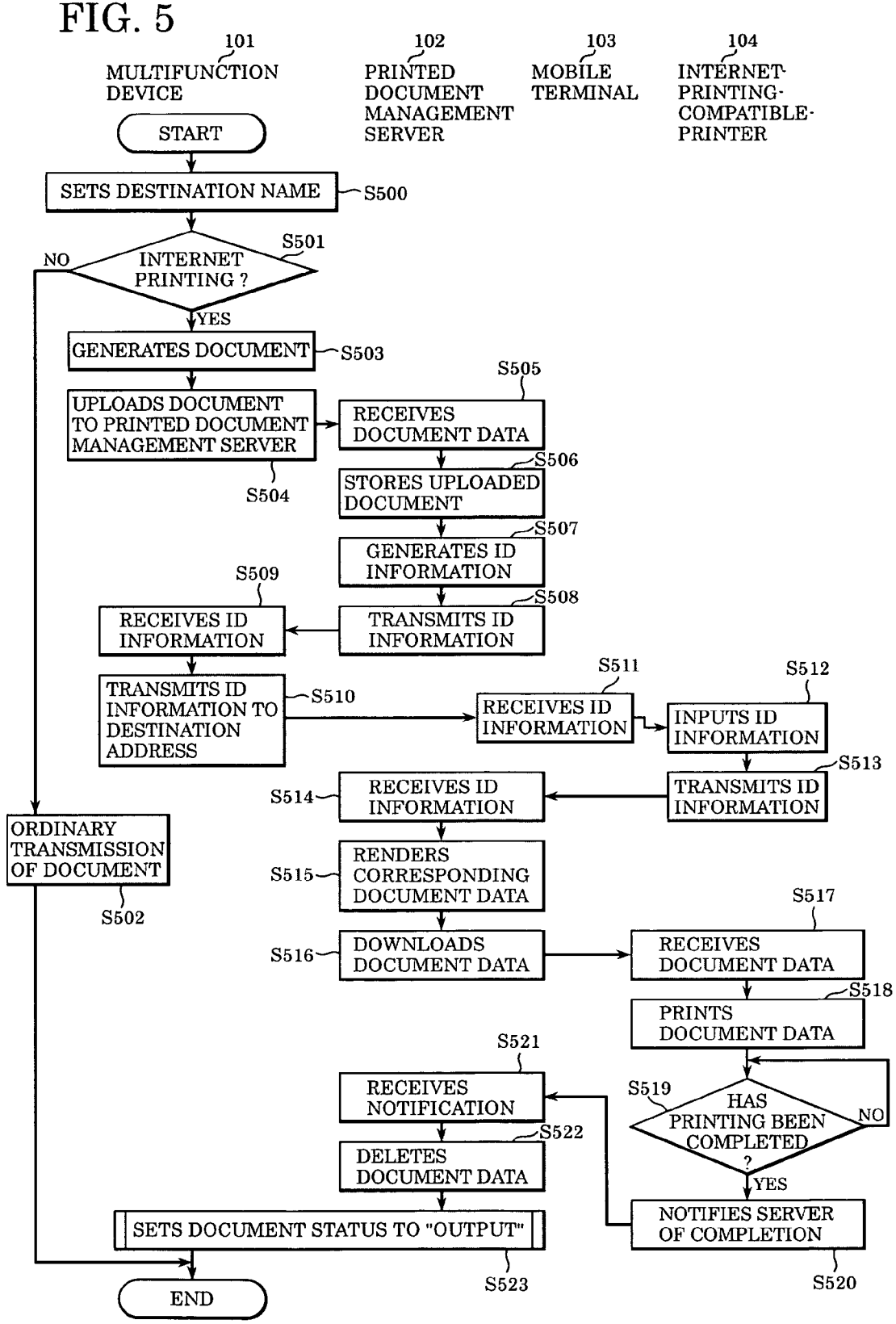

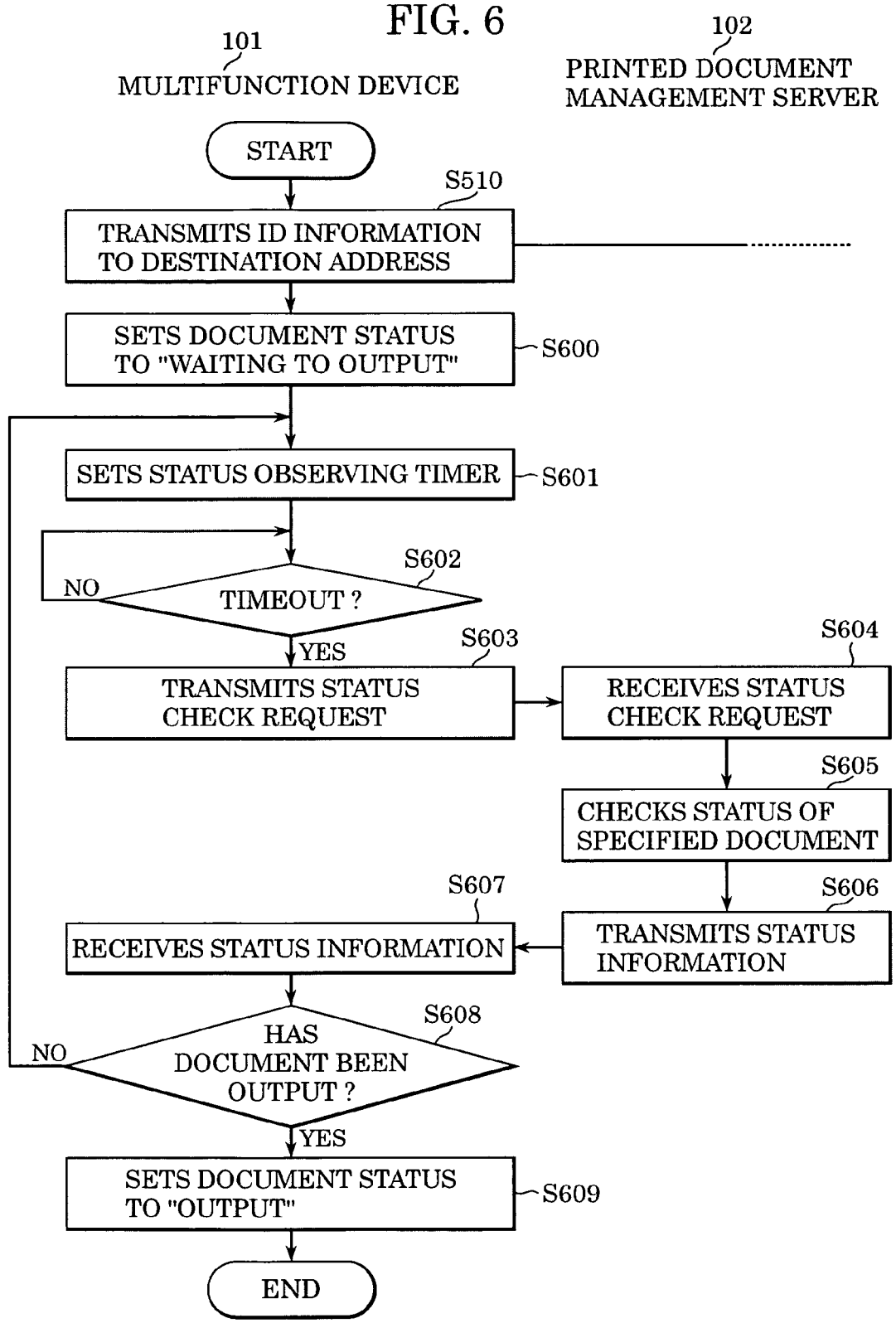

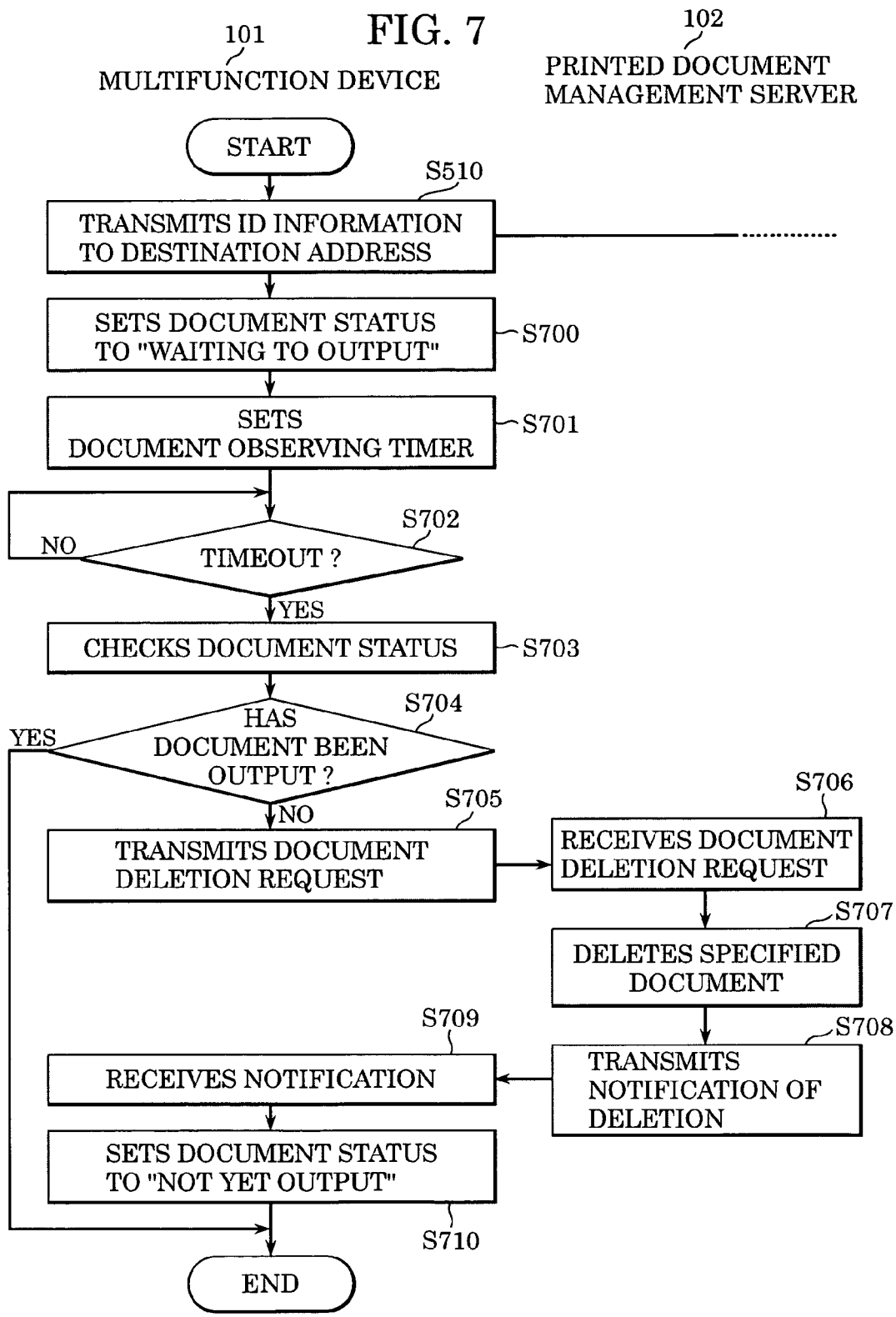

FIG. 8

```
*********************
* Communication Management Report *
*********************
```

800

| Section ID : 1234 |

| Start time | Destination address | Destination name | Reception number | Transmission mode | | Number of pages | Communication status |
|---|---|---|---|---|---|---|---|
| *10/21 15:41 | aaa@keitai.ne.jp | ppp | 0821 | Transmission | e-mail | 3 | 00' 05 |
| *10/22 18:34 | bbb@pc.ne.jp | qqq | 0822 | Transmission | e-mail | 7 | 00' 10 |
| *10/25 19:07 | ccc@keitai2.ne.jp | rrr | 0823 | Transmission | Internet printing | 10 | waiting to output 00' 08 |

| Section ID : 5678 |

| Start time | Destination address | Destination name | Reception number | Transmission mode | | NUMBER PAGES | Communication status |
|---|---|---|---|---|---|---|---|
| *09/29 19:10 | ddd@pc2.ne.jp | sss | 0748 | Transmission | Internet printing | 1 | output 00' 01 |
| *10/02 11:22 | eee@keitai.ne.jp | ttt | 0749 | Transmission | Internet printing | 12 | not yet output 00' 21 |
| *10/06 19:57 | fff@pc3.co.jp | uuu | 0750 | Transmission | e-mail | 2 | 00' 07 |
| 10/16 09:42 | ggg@keitai2.ne.jp | vvv | 0751 | Transmission | e-mail | | |

801

802

| NAME | ADDRESS | INTERNET PRINTING |
|---|---|---|
| Sales rep A | aaa@keitai.ne.jp | O |
| Sales rep B | bbb@pc.ne.jp | |
| Sales rep C | ccc@keitai2.ne.jp | O |
| General Affairs A | soumua@pc.ne.jp | |

INFORMATION PROCESSING DEVICE, INFORMATION PROCESSING METHOD, AND CONTROL PROGRAM

CROSS REFERENCE TO RELATED APPLICATIONS

This application claims priority from Japanese Patent Application No. 2004-141491 filed May 11, 2004, which is hereby incorporated by reference herein.

BACKGROUND OF THE INVENTION

1. Field of the Invention

The present invention relates to control of an information processing device transmitting/receiving electronic documents.

2. Description of the Related Art

With a recent development in office automation (OA) equipment, multifunction devices having various functions have emerged and have become widespread in offices. The various functions include a printer function, a copy function, and a facsimile function, each conventionally being realized by an individual device. These multifunction devices are usually connected to a network, and are capable of printing various documents created in a client personal computer (PC) on the network, printing image data input from a scanner, and transmitting image data to a specified device (e.g., a PC, a facsimile, or a multifunction device to which a modem connects) by using a G3 facsimile protocol. Further, a device having a document transmitting function of transmitting image data to a specified PC through the Internet has recently emerged.

On the other hand, a service called "Internet printing" has started to become widespread for inputting/outputting image data through the Internet. In Internet printing, a user uploads a document to a document management server through the Internet from a device (a PC, a mobile phone, a personal data assistant (PDA), or the like), and then the document management server generates identification (ID) information for the uploaded document and notifies the user of the ID information. Accordingly, by inputting the ID information to a printer compatible with an Internet printing service installed in various places, such as a convenience store, a hotel, a station, and an airport, the user can download the corresponding document from the document management sever and print the document.

However, in the above-described document transmitting function through the Internet, image data cannot be transmitted to a widespread Internet-connectable mobile terminal, such as a mobile phone and a PDA, because these mobile terminals can receive only a limited amount of data.

Further, the Internet printing is used for downloading and printing a document by a user who has uploaded the document, and is not used for transmitting a document to a third party.

Japanese Patent Laid-Open No. 2002-204345 discloses a communication device that changes a data transmitting method in accordance with a communication speed.

SUMMARY OF THE INVENTION

The present invention enables a user to transmit a document to a third party using a mobile terminal by using network printing.

According to an aspect of the present invention, an information processing device includes: a storage unit adapted to store a correspondence between destination names and e-mail addresses; a setting unit adapted to set a destination name to which a document is to be transmitted; and an upload unit adapted to upload the document to a document management server for a network printing in which a document is uploaded to the document management server and then output in response to an output request from an owner of the e-mail address if an e-mail address corresponding to the destination name set by the setting unit is a predetermined e-mail address. The uploaded document can be downloaded from the document management server to a printer through a communication medium and can be printed.

Other features and advantages of the present invention will be apparent from the following description taken in conjunction with the accompanying drawings, in which like reference characters designate the same or similar parts throughout thereof.

BRIEF DESCRIPTION OF THE DRAWINGS

FIG. 5 is a flowchart showing an operation of transmitting a document performed by the document transmitting system using the Internet printing according to the embodiment.

FIG. 6 is a flowchart showing an operation of observing a document processing status between the multifunction device and the printed document management server in the document transmitting system using the Internet printing according to the embodiment.

FIG. 7 is a flowchart showing an operation performed when a document uploaded to the printed document management server by the multifunction device is not output by a user of a mobile terminal in the document transmitting system using the Internet printing according to the embodiment.

FIG. 8 shows an example of a communication management report generated by the multifunction device in the document transmitting system using the Internet printing according to the embodiment.

DESCRIPTION OF THE EMBODIMENT

Figure 1:
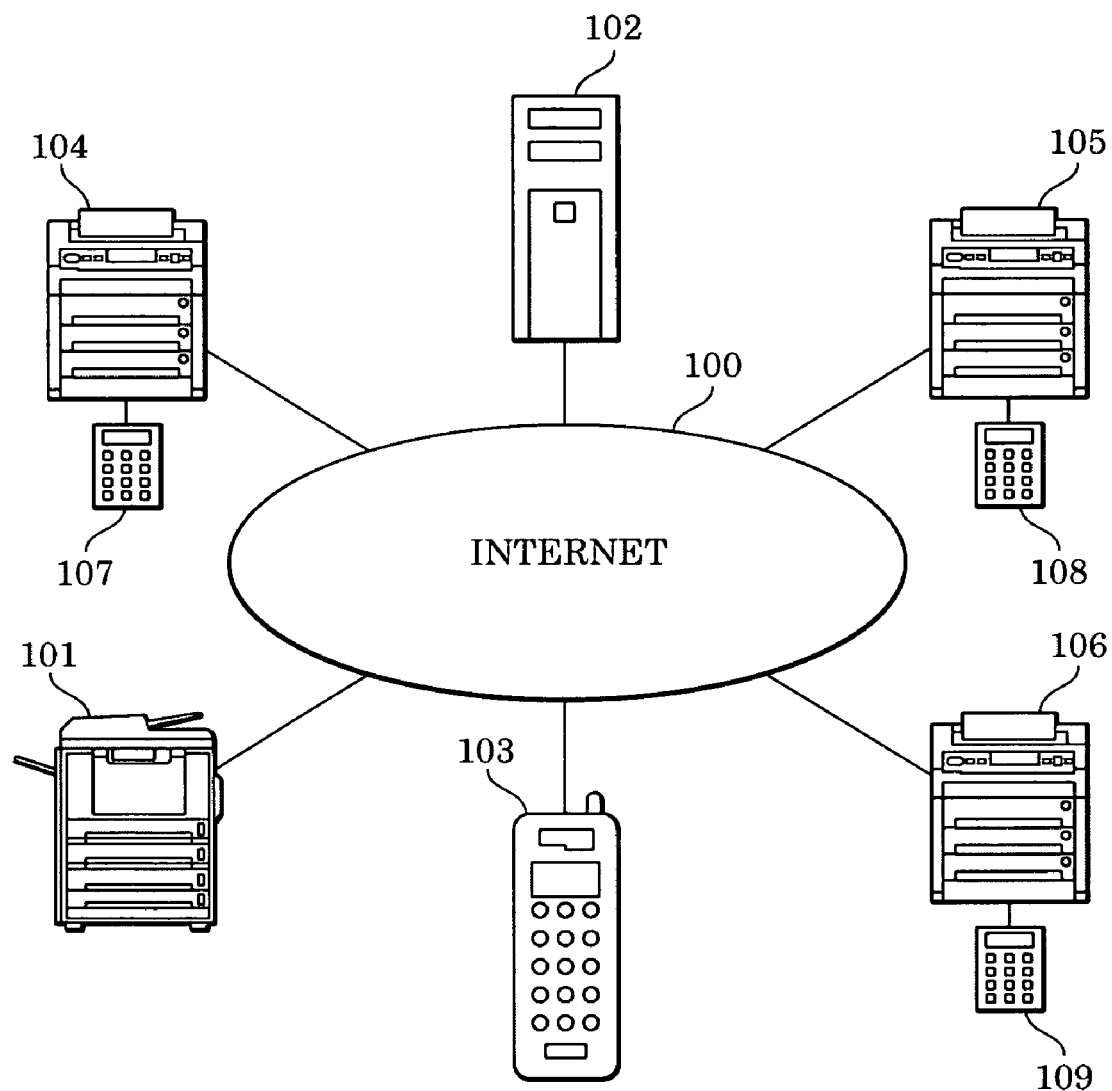
FIG. 1 shows a configuration of a network in which a document transmitting system using an Internet printing according to an embodiment of the present invention can operate.

Hereinafter, an embodiment of the present invention will be described with reference to the drawings. FIG. 1 shows a configuration of a network on which a document transmitting system using Internet printing according to an embodiment of the present invention can operate.

In FIG. 1, a multifunction device 101 has a printer function, a copy function, and a facsimile function, and is capable of transmitting documents and transferring files by using various protocols. A printed document management server 102 is capable of storing a document uploaded from the multifunction device 101, rendering the document in response to a print request, and outputting the document from any of printers 104 to 106 joining in the Internet printing service. A mobile phone 103 is an example of a mobile terminal, and may be another type of mobile terminal, such as a personal digital assistant (PDA). The printers 104, 105, and 106 are printers joining in the Internet printing service, and expansion boxes 107, 108, and 109 for inputting identification (ID) information required for executing Internet printing are connected thereto, respectively. These devices 101 to 106 are connected to the Internet 100 and are capable of communicating with each other.

An e-mail address of a third party to which a document is transmitted may be an e-mail address of a mobile phone (mobile terminal) or that of a personal computer or the like. When the e-mail address of the third party is that of a personal computer, a user can transmit a document in an ordinary manner. However, transmitting a document to an e-mail address of a mobile phone may involve problems. That is, in a mobile phone, an amount of document that can be received is limited, a display is small, and thus a document thereon is difficult to be printed out. In order to overcome these problems, a document is transmitted by using the Internet printing when a destination address of the document is an e-mail address of a mobile phone.

A user provides a printed document to a third party by using the Internet printing when an e-mail address of the third party is an address of the mobile phone 103. More specifically, the user selects a destination from an address book and specifies a document to be transmitted. Then, the multifunction device 101 uploads the document from the multifunction device 101 to the printed document management server 102. The printed document management server 102 stores the uploaded document and transmits ID information to the multifunction device 101. The multifunction device 101 receives the ID information and transmits it to the mobile phone 103 of the third party as the destination. The third party receives the ID information on the mobile phone 103, inputs the ID information to, for example, the expansion box 107 of the printer 104, so as to request printing. The printed document management server 102 receives the ID information from the printer 104 and checks it. If the ID information is valid, the document is downloaded from the printed document management server 102 to the printer 104. Then, the printer 104 prints the downloaded document. Incidentally, the printers 104 to 106 compatible with the Internet printing are installed in various places, such as convenience stores, hotels, stations, and airports. In this way, by transmitting ID information to the mobile phone 103 and transmitting a document to the printer 104 or the like through the printed document management server 102, a large amount of data including image data and so on can be transmitted.

Figure 2:
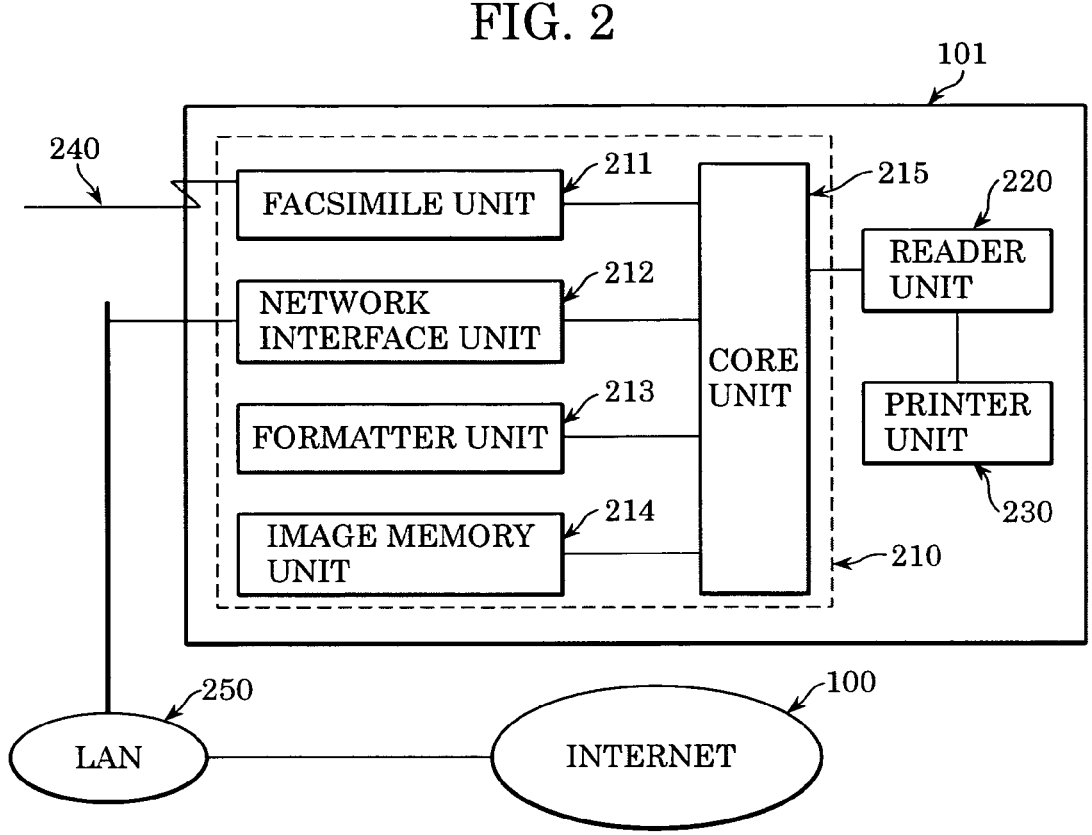
FIG. 2 is a block diagram showing an internal configuration of a multifunction device uploading a document to a printed document management server in the embodiment.

FIG. 2 is a block diagram showing an internal configuration of the multifunction device 101, which uploads a document to the printed document management server 102 in the embodiment. In FIG. 2, the multifunction device 101 has scanner, printer, copy, and facsimile functions, and a network interface unit 212 thereof is connected to the Internet 100 through a local area network (LAN) 250.

The multifunction device 101 mainly includes a reader unit 220, a printer unit 230, and an image input/output control unit 210. The reader unit 220 is connected to the printer unit 230 and the image input/output control unit 210, reads images of a document, and outputs read image data to the printer unit 230 or the image input/output control unit 210. The printer unit 230 prints image data output from the reader unit 220 and the image input/output control unit 210 on recording paper.

The image input/output control unit 210 is connected to the outside networks 250 and 100 and a public line network 240 and controls input/output of image data. For example, the image input/output control unit 210 receives image data through a facsimile unit 211 in accordance with a facsimile protocol. Also, the image input/output control unit 210 transmits/receives image data through the network interface unit 212 in accordance with various protocols. Further, the image input/output control unit 210 manages a usage status when a user uses the multifunction device 101 and a document processing status and analyzes/controls a job (a print command and so on) from a computer connected to the network.

The image input/output control unit 210 includes the facsimile unit 211, the network interface unit 212, a PDL formatter unit 213, an image memory unit 214, and a core unit 215. The facsimile unit 211 is connected to the core unit 215 and the public line network 240, so as to decompress compressed image data received from the public line network 240 and transmit the decompressed image data to the core unit 215. Also, the facsimile unit 211 compresses image data transmitted from the core unit 215 and externally outputs the compressed image data through the public line network 240.

The network interface unit 212 is a functional module controlling communication with various network devices connected to the LAN 250 and the Internet 100. Reception of job control data from a computer or the like and transmission of image data or the like to a computer are performed through the network interface unit 212. The job control data includes a job control command transmitted together with PDL data. The job control command is used to, for example, sort and staple ejected sheets of paper after decompressing the PDL data and printing it as image data. The formatter unit 213 is connected to the core unit 215 and decompresses PDL data transmitted from a computer to generate image data that can be printed by the printer unit 230. The image memory unit 214 temporarily stores information from the reader unit 220 and information transmitted from a computer through the network interface unit 212.

The core unit 215 controls data and so on transmitted among the above-described reader unit 220, the facsimile unit 211, the network interface unit 212, the PDL formatter unit 213, and the image memory unit 214. Also, the core unit 215 analyzes job control data and manages a job processing status and stores information thereof.

Figure 3:
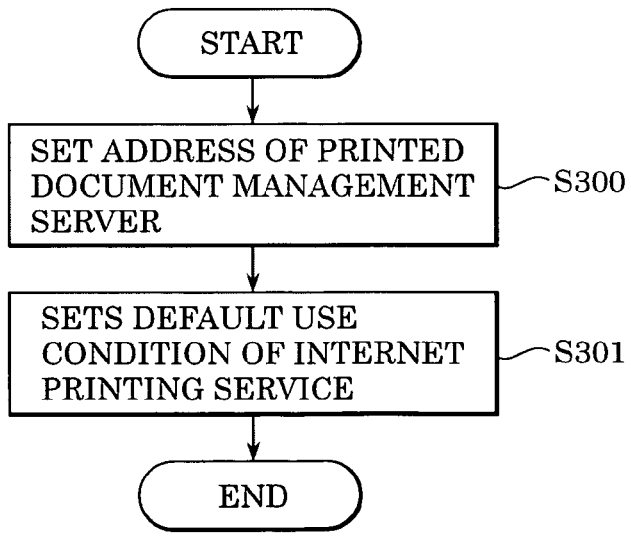
FIG. 3 is a flowchart showing an operation of setting various parameters regarding an Internet printing service in the multifunction device in the document transmitting system using the Internet printing according to the embodiment.

FIG. 3 is a flowchart showing an operation of setting various parameters regarding the Internet printing service on the multifunction device 101 in the document transmitting system using the Internet printing according to the embodiment.

Referring to FIG. 3, in step S300, a user sets an address of the printed document management server 102 in the multifunction device 101 and the process proceeds to step S301.

In step S301, the user sets a use condition of the Internet printing service in the multifunction device 101, the use condition being referred to when a document is transmitted. For example, a setting of whether the user uses the Internet printing service to transmit data to a destination address may be directly set in step S301. Also, a use condition of the Internet printing may be set for part of the address (e.g., a domain name of an e-mail address). The Internet printing is a favorable example of network printing, in which a document is uploaded to the printed document management server 102 through a communication medium (Internet) and is output in response to an output request from an owner of a corresponding e-mail address.

Figure 4A:
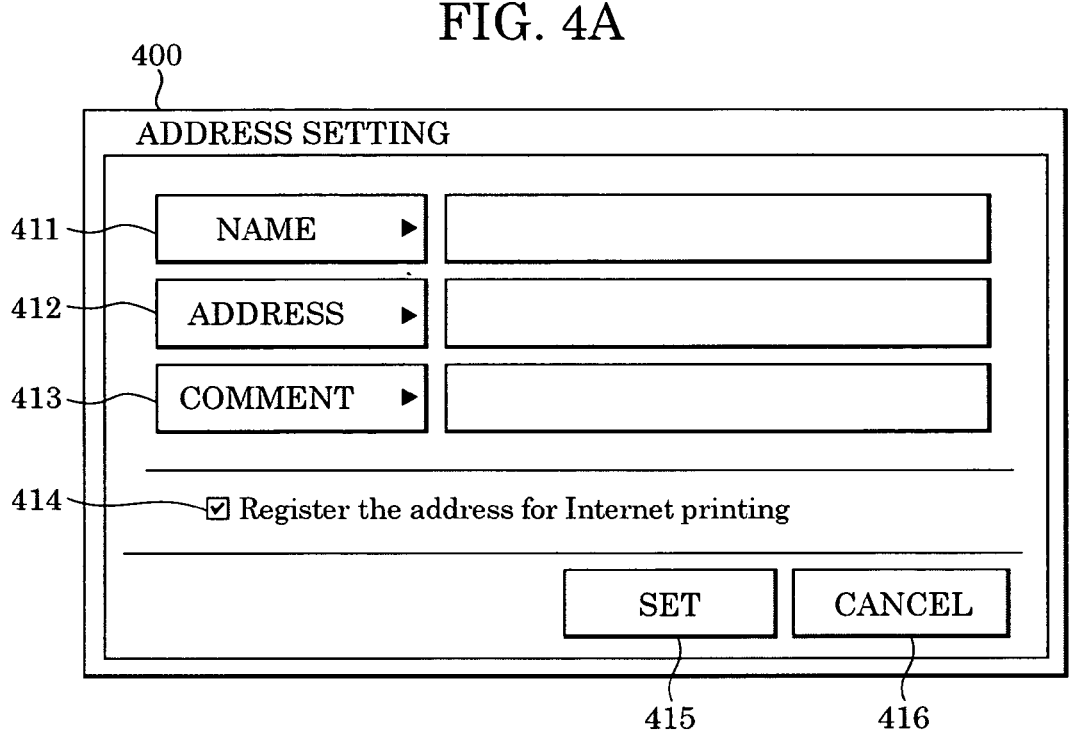
FIGS. 4A and 4B show screens used for setting a use condition of the Internet printing service in the multifunction device in the document transmitting system using the Internet printing according to the embodiment.
Figure 4B:
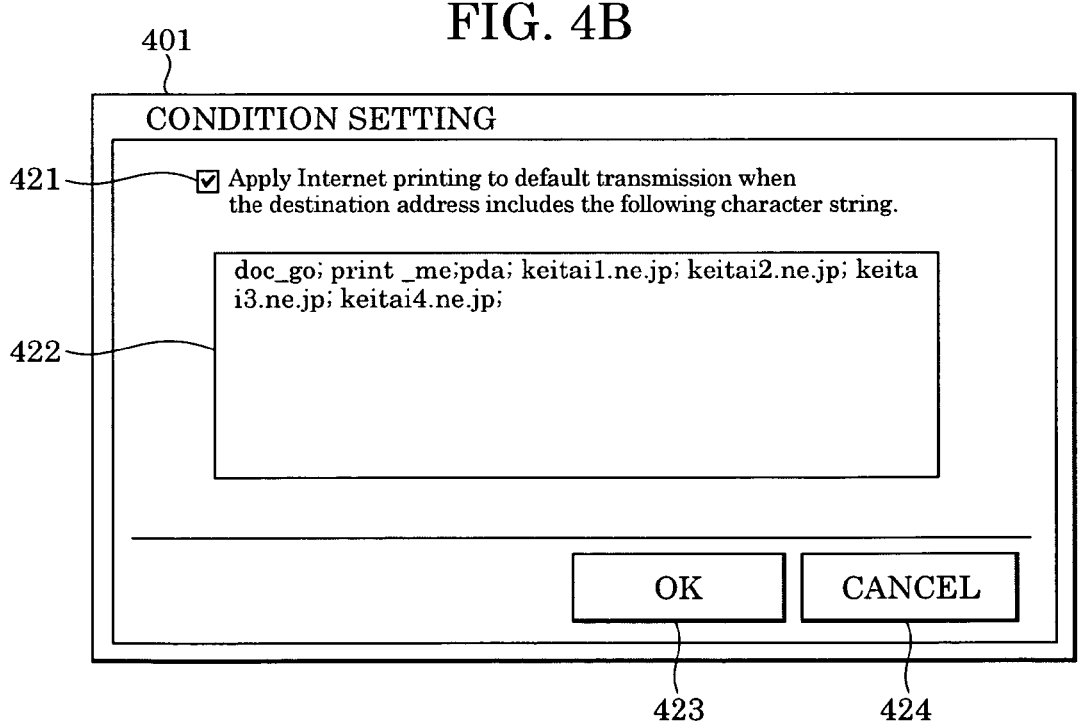

FIGS. 4A and 4B show an example of screen images displayed in the multifunction device 101 when a use condition of the Internet printing service is set in step S301 in FIG. 3. In FIG. 4A, a screen 400 is used for setting a condition whether or not the Internet printing is used for a destination address. A user inputs a name of a destination 411, an e-mail address 412, and a comment 413, and checks a check box 414 in order to register the input address in an address book for the Internet printing. When the user uses the Internet printing, a printed document is provided through the Internet printing. On the other hand, when the user does not use the Internet printing, the user directly transmits a document to a destination e-mail address in an ordinary manner. When the user pushes a set button 415 after inputting data, the new destination is registered in an address book database shown in FIG. 9B. A name field 911, an address field 912, and an Internet printing field 913 in FIG. 9B correspond to the name 411, the address 412, and the checkbox 414 in FIG. 4A, respectively. The settings on the screen 400 can be canceled by pushing a cancel button 416.

In the screen 400, the user can select whether or not to apply the Internet printing to each address by checking the check box 414. Hereinafter, a method for setting a use condition of the Internet printing in a screen 401 without checking the check box 414 will be described.

The screen 401 shown in FIG. 4B is used for setting an address or part of an address as a use condition of the Internet printing. A check box 421 is checked by the user to apply the Internet printing as a default transmission when a destination address includes a character string displayed in a character string field 422. The user can input an address or part of an address (domain name) in the character string field 422. For example, by inputting a domain name of a mobile phone in the character string field 422 and checking the check box 421, the user can allow the multifunction device 101 to automatically transmit a document by the Internet printing when the destination address includes the character string input in the character string field 422.

FIG. 5 is a flowchart showing an operation of transmitting a document in the document transmitting system using the Internet printing according to the embodiment.

Figures 9A, 9B:
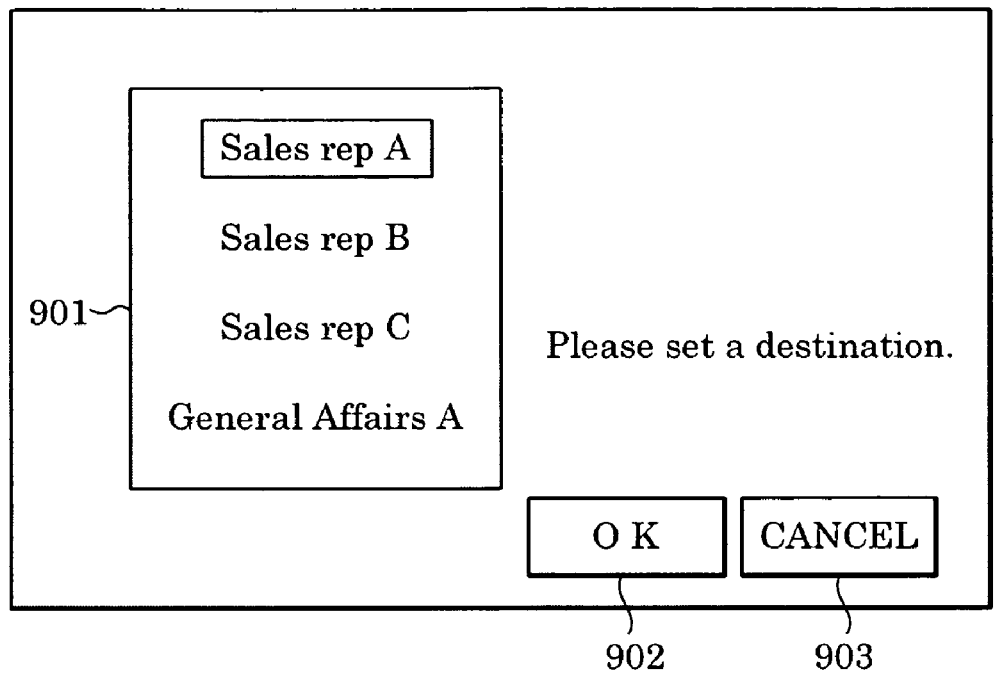
FIGS. 9A and 9B show a screen for setting a destination name and a database, respectively.

Referring to FIG. 5, in step S500, a user sets (selects) a destination name to which a document is to be transmitted from a destination list 901 and pushes an OK button 902 on a display shown in FIG. 9A of the multifunction device 101. By pushing a cancel button 903, the destination setting can be canceled. The destination name corresponds to the name 411 shown in FIG. 4A and is a so-called abbreviated name. Then, the multifunction device 101 converts the selected destination name 911 to a corresponding e-mail address 912 based on the database shown in FIG. 9B, and the process proceeds to step S501. If the destination address 912 is an e-mail address of a mobile terminal (mobile phone), a domain name of the destination address 912 indicates a company providing a mobile phone service.

In step S501, the multifunction device 101 refers to the use condition of the Internet printing which was set in step S301 in FIG. 3. If the multifunction device 101 determines not to use the Internet printing (no in step S501), the process proceeds to step S502. If the multifunction device 101 determines to use the Internet printing (yes in step S501), the process proceeds to step S503.

Specifically, if the destination e-mail address has been registered as an address for Internet printing in the check box 414 in the screen 400 shown in FIG. 4A, it is determined that the Internet printing is to be used. Also, it is determined that the Internet printing is to be used if the destination e-mail address includes a character string shown in the character string field 422 of the screen 401 shown in FIG. 4B. That is, the Internet printing is used when the destination address includes a character string indicating a company providing a mobile phone service.

In step S502, the multifunction device 101 transmits a specified document to the e-mail address.

In step S503, the multifunction device 101 generates a document to be transmitted by reading data input from the reader unit 220. Then, the process proceeds to step S504.

In step S504, the multifunction device 101 uploads the document generated in step S503 to the printed document management server 102 whose address was set in step S300 in FIG. 3. Then, the process proceeds to step S505.

In step S505, the printed document management server 102 receives the document uploaded from the multifunction device 101 in step S504. Then, the process proceeds to step S506.

In step S506, the printed document management server 102 stores the document received in step S505. Then, the process proceeds to step S507.

In step S507, the printed document management server 102 generates ID information for identifying the document stored in step S506. Then, the process proceeds to step S508.

In step S508, the printed document management server 102 transmits the ID information generated in step S507 to the multifunction device 101. Then, the process proceeds to step S509.

In step S509, the multifunction device 101 receives the ID information transmitted from the printed document management server 102 in step S508. Then, the process proceeds to step S510.

In step S510, the multifunction device 101 transmits the ID information received from the printed document management server 102 in step S509 to the mobile terminal 103 which is indicated by the destination e-mail address set in step S500. Then, the process proceeds to step S511.

In step S511, the mobile terminal 103 receives the ID information transmitted from the multifunction device 101 in step S510. Then, the process proceeds to step S512.

In step S512, a user of the mobile terminal 103 inputs the ID information received from the multifunction device 101 in step S511 to an expansion box (e.g., the expansion box 107) of a printer compatible with the Internet printing service (e.g., the printer 104). Then, the process proceeds to step S513. The user of the mobile terminal 103 can use any of the printers 104 to 106 compatible with the Internet printing service near the user.

In step S513, the printer 104 compatible with the Internet printing service transmits the ID information input by the user of the mobile terminal 103 in step S512 to the printed document management server 102. Then, the process proceeds to step S514.

In step S514, the printed document management server 102 receives the ID information transmitted from the printer 104 in step S513. Then, the process proceeds to step S515.

In step S515, the printed document management server 102 renders a document corresponding to the ID information received in step S514 among stored documents. Then, the process proceeds to step S516.

In step S516, the printed document management server 102 downloads the document data rendered in step S515 to the printer 104 compatible with the Internet printing service. Then, the process proceeds to step S517.

In step S517, the printer 104 compatible with the Internet printing service receives the document downloaded from the printed document management server 102 in step S516. Then, the process proceeds to step S518.

In step S518, the printer 104 compatible with the Internet printing service prints the document received in step S517. Then, the process proceeds to step S519.

In step S519, the printer 104 compatible with the Internet printing service observes a printing operation performed in step S518 to determine whether or not printing has been completed. If the printing has been completed (yes in step S519), the process proceeds to step S520. Otherwise (no in step S519), the printer 104 continues to observe the printing operation in step S519.

In step S520, since the printer 104 compatible with the Internet printing service determined that the printing operation has been completed in step S519, the printer 104 notifies the printed document management server 102 of the completion of printing together with the ID information of the printed document. Then, the process proceeds to step S521.

In step S521, the printed document management server 102 receives the notification of completion from the printer 104 compatible with the Internet printing service. Then, the process proceeds to step S522.

In step S522, the printed document management server 102 deletes the document corresponding to the ID information received together with the notification of completion in step S521. Then, the process proceeds to step S523.

In step S523, the status of the printed document is set to "output" as a result of a document-status observing process performed between the printed document management server 102 and the multifunction device 101. Then, the process is completed. The document-status observing process will be specifically described later with reference to FIG. 6.

FIG. 6 is a flowchart showing an operation of observing a document processing status by the multifunction device 101 and the printed document management server 102 in the document transmitting system using the Internet printing according to the embodiment.

Referring to FIG. 6, after step S510 in FIG. 5, where the multifunction device 101 notifies the mobile terminal 103 indicated by the destination address of the ID information of the document, the process proceeds to step S600. In step S600, the multifunction device 101 sets a status of the document held therein to "waiting to output". Then, the process proceeds to step S601.

In step S601, the multifunction device 101 sets a timer for periodically observing a document processing status in the printed document management server 102. Then, the process proceeds to step S602.

In step S602, the multifunction device 101 observes the timer set in step S601. When a timeout occurs (yes in step S602), the process proceeds to step S603. Otherwise, (no in step S602), the process does not proceed (i.e., waits until a timeout occurs).

In step S603, since a timeout occurred in step S602, the multifunction device 101 transmits a status check request including the ID information of the document to the printed document management server 102 in order to know the processing status of the uploaded document. Then, the process proceeds to step S604.

In step S604, the printed document management server 102 receives the status check request transmitted by the multifunction device 101 in step S603. Then, the process proceeds to step S605.

In step S605, the printed document management server 102 checks a processing status of the document corresponding to the ID information included in the status check request received in step S604. Then, the process proceeds to step S606.

In step S606, the printed document management server 102 transmits document status information to the multifunction device 101 in order to notify the multifunction device 101 of the document processing status checked in step S605. Then, the process proceeds to step S607.

In step S607, the multifunction device 101 receives the document status information transmitted from the printed document management server 102 in step S606. Then, the process proceeds to step S608.

In step S608, the multifunction device 101 analyzes the document status information received in step S607 in order to determine whether the notified document status is set to "output". If the document status is set to "output" (yes in step S608), the process proceeds to step S609. If the document status is set to "waiting to output" (no in step S608), the process returns to step S601.

In step S609, since it was determined that the document has been output in step S608, the multifunction device 101 sets the document status to "output". Then, the process is completed.

FIG. 7 is a flowchart showing an operation performed when the document uploaded by the multifunction device 101 to the printed document management server 102 has not been output by the user of the mobile terminal 103 in the document transmitting system using the Internet printing according to the embodiment.

Referring to FIG. 7, after step S510 in FIG. 5, where the multifunction device 101 notifies the mobile terminal 103 indicated by the destination address of the ID information of the document, the process proceeds to step S700. In step S700, the multifunction device 101 sets a status of the document held therein to "waiting to output". Then, the process proceeds to step S701.

In step S701, the multifunction device 101 sets a timer to a predetermined timer value so that the document uploaded to the printed document management server 102 is deleted if the document is not output.

In step S702, the multifunction device 101 observes the timer set in step S701. When a timeout occurs (yes in step S702), the process proceeds to step S703. Otherwise (no in step S702), the process does not proceed.

The timer may be stopped when the document status is set to "output" in step S609 in FIG. 6, so that the process may be completed.

In step S703, since it was determined that a timeout has occurred in step S702, the multifunction device 101 checks a processing status of the uploaded document. Then, the process proceeds to step S704.

In step S704, the multifunction device 101 analyzes the document status information checked in step S703 in order to determine whether the document status is set to "output". If the document status is set to "waiting to output" (no in step S704), the process proceeds to step S705. If the document status is set to "output" (yes in step S704), the process is completed.

In step S705, since it was determined that the document status is set to "waiting to output" in step S704, the multifunction device 101 transmits a document deletion request including the ID information of the document to the printed document management server 102 in order to delete the uploaded document. Then, the process proceeds to step S706.

In step S706, the printed document management server 102 receives the document deletion request transmitted by the multifunction device 101 in step S705. Then, the process proceeds to step S707.

In step S707, the printed document management server 102 deletes the document corresponding to the ID information included in the document deletion request received in step S706. Then, the process proceeds to step S708.

In step S708, the printed document management server 102 transmits a notification indicating that the document has been deleted to the multifunction device 101 in order to notify the multifunction device 101 that the document was deleted in step S707. Then, the process proceeds to step S709.

In step S709, the multifunction device 101 receives the notification transmitted from the printed document management server 102 in step S708. Then, the process proceeds to step S710.

In step S710, the multifunction device 101 sets the status of the deleted document to "not yet output". Then, the process is completed.

The multifunction device 101 generates information about a document status found by the procedure shown in FIGS. 6 and 7 and notifies the user of the information by using a communication management report shown in FIG. 8, for example.

FIG. 8 shows an example of the communication management report generated by the multifunction device 101 in the document transmitting system using the Internet printing according to the embodiment. In FIG. 8, a job 800 indicates information when the status is set to "waiting to output". A job 801 indicates information when the status is set to "output". A job 802 indicates information when the status is set to "not yet output".

Figure 10:
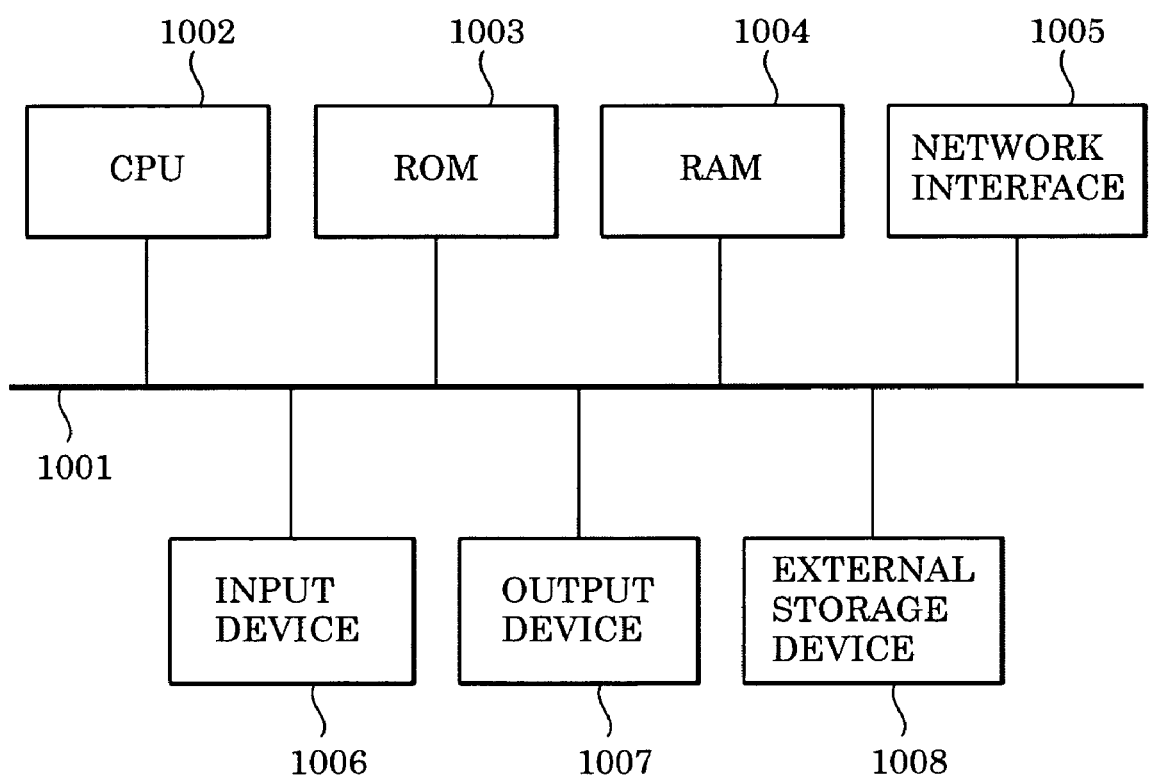
FIG. 10 is a block diagram showing an example of a hardware structure of a computer.

FIG. 10 shows an example of a hardware structure of a computer in the multifunction device 101, the printed document management server 102, the mobile terminal (mobile phone) 103, and the printers 104 to 106. The above-described processes of the embodiment are realized when the computer executes a program.

A central processing unit (CPU) 1002, a read only memory (ROM) 1003, a random access memory (RAM) 1004, a network interface 1005, an input device 1006, an output device 1007, and an external storage device 1008 are connected to a bus 1001.

The CPU 1002 processes or operates data and controls various components connected thereto through the bus 1001. A control procedure (computer program) for the CPU 1002 is stored in the ROM 1003 in advance. When the CPU 1002 executes the computer program, the program starts. A computer program is stored in the external storage device 1008, and the computer program is copied to the RAM 1004 and is executed. The RAM 1004 is used as a work memory for inputting/outputting or transmitting/receiving data and as a temporary storage for controlling each unit. The external storage device 1008 is a hard disk storage device, a CD-ROM (compact disk—read only memory), or the like, and stored content therein is not erased even when a power is turned off. The CPU 1002 performs the processes shown in FIGS. 3 and 5 to 7 by executing the computer program stored in the RAM 1004.

The network interface 1005 is used to connect to a network, such as the Internet. The input device 1006 is a touch panel or buttons, for example, and is used to specify or input data. The output device 1007 is a display (including a touch panel), a printer, or the like.

The above-described embodiment can be realized when a computer executes a program. A unit for supplying the program to the computer, for example, a computer-readable recording medium such as a CD-ROM containing the program or a transmission medium such as the Internet transmitting the program can be applied as an embodiment of the present invention. Also, a computer program product, such as a computer-readable recording medium containing the program can be applied as an embodiment of the present invention. The above-described program, recording medium, transmission medium, and computer program product are included in the scope of the present invention. Examples of the recording medium include a flexible disk, a hard disk, an optical disk, a magneto-optical disk, a CD-ROM, a magnetic tape, a nonvolatile memory card, and a ROM.

As described above, according to the embodiment, a correspondence between destination names and e-mail addresses is stored in a database (storage unit) as shown in FIG. 9B, and a destination name to which a document is to be transmitted is set as shown in FIG. 9A. The multifunction device 101 uploads a document to the document management server 102 for the Internet printing in accordance with an e-mail address corresponding to the set destination name. The uploaded document is downloaded from the document management server 102 to the printer 104, for example, through the Internet 100, so that the document can be printed. Accordingly, a document for the Internet printing can be transmitted, so that a large amount document including image data can be transmitted to a third party using a mobile terminal in which a document storage area is limited.

As shown in FIG. 6, in step S600, the multifunction device 101 sets a status of the document uploaded to the document management server 102 to "waiting to output". Then, in step S603, the multifunction device 101 asks the document management server 102 whether the document management server 102 has output the document to the printer 104 or the like. Then, after receiving a notification indicating that the document management server 102 has output the document to the printer 104, the multifunction device 101 sets the document status to "output" in step S609. In this way, a user who has transmitted a document can accurately recognize a processing status of the document.

On the other hand, as shown in FIG. 7, if the document management server 102 does not output the document to the printer 104 or the like within a predetermined time period, the multifunction device 101 requests deletion of the uploaded document to the document management server 102. Accordingly, a document storage area in the document management server 102 can be efficiently used.

While the present invention has been described with reference to an exemplary embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A document transmitting system for a user to utilize a multifunction device and a printed-document management server as part of an Internet Printing service to provide, to a third party over the Internet, a document-to-be-printed in a case where the user selects an e-mail address of a third party mobile terminal of the third party as a destination address of the document-to-be-printed, the document transmitting system comprising:

(A) the multifunction device, wherein the multifunction device includes:
- a scanner adapted to receive an original printed document from the user and to optically scan the original printed document to generate the document-to-be-printed as a digital representation of the original printed document,
- a database storing e-mail addresses and correlation information that correlates each stored e-mail address to a different destination name, wherein the stored e-mail addresses include the e-mail address of the third party mobile terminal and a device e-mail address of a device different from the third party mobile terminal,
- a display unit adapted to display a destination setting screen and a condition setting screen,
- an upload unit adapted to upload a document through the Internet directly to the printed-document management server,
- a document transmitting unit adapted to transmit a document through the Internet directly to the third party mobile terminal,
- an identification information receiving unit adapted to receive identification information over the Internet from the printed-document management server,
- an e-mail transmitting unit adapted to transmit an e-mail to a third party mobile terminal, an input unit adapted to receive, via the destination setting screen, a destination name input by a user and register, via the condition setting screen, preliminarily registered domain information for Internet printing for an e-mail address, wherein the preliminarily registered domain information is domain information for specifying the third party mobile terminal,
- a processing unit adapted to select an e-mail address that is stored in the database and correlates to the destination name received by the input unit and to determine whether that selected e-mail address includes preliminarily registered domain information for Internet printing, wherein,
- in a case where the processing unit determines that the selected e-mail address does not include preliminarily registered domain information for Internet printing, the selected email address is the device e-mail address of the device that is different from the third party mobile terminal and the document transmitting unit uses the selected email address to transmit the document-to-be-printed through the Internet directly to the device that is different from the third party mobile terminal, and
- in a case where the processing unit determines that the selected e-mail address includes preliminarily registered domain information for Internet printing, the selected email address is the e-mail address of the third party mobile terminal and (i) the upload unit uses the selected email address to upload the document-to-be-printed through the Internet directly to the printed-document management server, (ii) the identification information receiving unit receives identification information over the Internet from the printed-document management server in response to the upload unit uploading the document-to-be-printed to the printed-document management server, and (iii) the e-mail transmitting unit transmits an identification information e-mail to the third party mobile terminal specified by the preliminarily registered domain information, wherein the identification information e-mail includes the received identification information, and
- a deletion request unit adapted to request the printed-document management server to delete the uploaded document-to-be-printed in a case where the printed-document management server does not output the uploaded document within a predetermined time period to a document printer that is located remote from the printed-document management server and the multifunction device;

(B) the printed printed-document management server position remote from the multifunction device, wherein the printed printed-document management server includes:
- a document storage unit adapted to receive the uploaded document-to-be-printed from the multifunction device and to store the uploaded document-to-be-printed as a stored document-to-be-printed,
- an identification information transmitting unit adapted to transmit the identification information to the identification information receiving unit of the multifunction device, wherein the identification information corresponds to the stored document-to-be-printed, and
- a deletion unit adapted to delete the stored document in accordance with a request received from the deletion request unit of the multifunction device; and (C) the third party mobile terminal, wherein the third party mobile terminal includes:
- an e-mail receiving unit adapted to receive the identification information e-mail having the identification information from the e-mail transmitting unit of the multifunction device wherein,
- in response to the third party reviewing the identification information e-mail and inputting the identification information from that e-mail into a document printer that is located remote from the printed-document management server and the multifunction device, the document printer downloads, from the printed-document management server, the stored document-to-be-printed corresponding to the identification information and prints the stored document-to-be-printed to create a duplicate printed document.

2. A method for a user to utilize a multifunction device and a printed-document management server as part of an Internet Printing service to provide, to a third party over the Internet, a document-to-be-printed in a case where the user selects an e-mail address of a third party mobile terminal of the third party as a destination address of the document-to-be-printed, the method comprising:
- receiving an original printed document from the user and optically scanning the original printed document to generate the document-to-be-printed as a digital representation of the original printed document;
- storing e-mail addresses and correlation information that correlates each stored e-mail address to a different destination name, wherein the stored e-mail addresses include the e-mail address of the third party mobile terminal and a device e-mail address of a device different from the third party mobile terminal;
- displaying, on a display unit, a destination setting screen and a condition setting screen;
- receiving, via the destination setting screen, a destination name input by a user and registering, via the condition setting screen, preliminarily registered domain information for Internet printing for an e-mail address, wherein the preliminarily registered domain information is domain information for specifying the third party mobile terminal, selecting a stored e-mail address that correlates to the received destination name and determining whether that selected e-mail address includes preliminarily registered domain information for Internet printing;

in a case where it is determined that the selected e-mail address does not include preliminarily registered domain information for Internet printing, concluding that the selected email address is the device e-mail address of the device that is different from the third party mobile terminal and using the selected email address to transmit the document-to-be-printed through the Internet directly to the device that is different from the third party mobile terminal, and in a case where it is determined that the selected e-mail address includes preliminarily registered domain information for Internet printing, concluding that the selected email address is the e-mail address of the third party mobile terminal and using the selected email address to upload the document-to-be-printed through the Internet directly to the printed-document management server, (ii) receiving identification information over the Internet from the printed-document management server in response the uploading of the document-to-be-printed to the printed-document management server, (iii) transmitting an identification information e-mail to the third party mobile terminal specified by the preliminarily registered domain information, wherein the identification information e-mail includes the received identification information, (iv) receiving, in the third party mobile terminal, the identification information e-mail having the identification information from the multifunction device, and (v) in response to the third party reviewing the identification information e-mail and inputting the identification information from that e-mail into a document printer that is located remote from the printed-document management server and the multifunction device, downloading, from the printed-document management server, the stored document-to-be-printed corresponding to the identification information and printing the stored document-to-be-printed to create a duplicate printed document; and requesting the printed-document management server to delete the uploaded document-to-be-printed in a case where the printed-document management server does not output the uploaded document within a predetermined time period to a document printer that is located remote from the printed-document management server and the multifunction device.

3. In a document transmitting system for a user to utilize a multifunction device and a printed-document management server as part of an Internet Printing service to provide, to a third party over the Internet, a document-to-be-printed in a case where the user selects an e-mail address of a third party mobile terminal of the third party as a destination address of the document-to-be-printed, a multifunction device system comprising:

the multifunction device wherein the multifunction device includes:

a scanner adapted to receive an original printed document from the user and to optically scan the original printed document to generate the document-to-be-printed as a digital representation of the original printed document, a database storing e-mail addresses and correlation information that correlates each stored e-mail address to a different destination name, wherein the stored e-mail addresses include the e-mail address of the third party mobile terminal and a device e-mail address of a device different from the third party mobile terminal, a display unit adapted to display a destination setting screen and a condition setting screen, an upload unit adapted to upload a document through the Internet directly to the printed-document management server, a document transmitting unit adapted to transmit a document through the Internet directly to the third party mobile terminal, an identification information receiving unit adapted to receive identification information over the Internet from the printed-document management server, an e-mail transmitting unit adapted to transmit an e-mail to a third party mobile terminal, an input unit adapted to receive, via the destination setting screen, a destination name input by a user and register, via the condition setting screen, preliminarily registered domain information for Internet printing for an e-mail address, wherein the preliminarily registered domain information is domain information for specifying the third party mobile terminal, a processing unit adapted to select an e-mail address that is stored in the database and correlates to the destination name received by the input unit and to determine whether that selected e-mail address includes preliminarily registered domain information for Internet printing, wherein, in a case where the processing unit determines that the selected e-mail address does not include preliminarily registered domain information for Internet printing, the selected email address is the device e-mail address of the device that is different from the third party mobile terminal and the document transmitting unit uses the selected email address to transmit the document-to-be-printed through the Internet directly to the device that is different from the third party mobile terminal, and in a case where the processing unit determines that the selected e-mail address includes preliminarily registered domain information for Internet printing, the selected email address is the e-mail address of the third party mobile terminal and (i) the upload unit uses the selected email address to upload the document-to-be-printed through the Internet directly to the printed-document management server, (ii) the identification information receiving unit receives identification information over the Internet from the printed-document management server in response to the upload unit uploading the document-to-be-printed to the printed-document management server, and (iii) the e-mail transmitting unit transmits an identification information e-mail to the third party mobile terminal specified by the preliminarily registered domain information, wherein the identification information e-mail includes the received identification information, and a deletion request unit adapted to request the printed-document management server to delete the uploaded document-to-be-printed in a case where the printed-document management server does not output the uploaded document within a predetermined time period to a document printer that is located remote from the printed-document management server and the multifunction device; and the third party mobile terminal, wherein the third party mobile terminal includes:

an e-mail receiving unit adapted to receive the identification information e-mail having the identification information from the e-mail transmitting unit of the multifunction device wherein, in response to the third party reviewing the identification information e-mail and inputting the identification information from that e-mail into a document printer that is located remote from the printed-document management server and the multifunction device, the document printer downloads, from the printed-document management server, the stored document-to-be-printed corresponding to the identification information and prints the stored document-to-be-printed to create a duplicate printed document.

4. The multifunction device according to claim 3, further comprising:
   a waiting-to-output setting unit adapted to set a status of the uploaded document-to-be-printed to "waiting to output";
   a check unit adapted to check whether the printed-document management server has output the uploaded document-to-be-printed to a document printer that is located remote from the printed-document management server and the multifunction device; and
   an output setting unit adapted to set the status of the uploaded document-to-be-printed to "output" after receiving a notification indicating that the printed-document management server has output the uploaded document-to-be-printed to the document printer.

5. The method according to claim 2, further comprising:
   setting a status of the uploaded document-to-be-printed to "waiting to output";
   checking whether the printed-document management server has output the uploaded document-to-be-printed to a document printer that is located remote from the printed-document management server and the multifunction device; and
   setting the status of the uploaded document-to-be-printed to "output" after receiving a notification indicating that the printed-document management server has output the uploaded document-to-be-printed to the document printer.

6. A non-transitory computer-readable medium storing a program causing a multifunction device to perform a method of claim 2.

7. The multifunction device of claim 3, wherein the printer is compatible with the Internet printing and installed remote from both the multifunction device and the printed document management server in one of a convenience store, a hotel, a station, and an airport.

8. The multifunction device of claim 3, wherein the document-to-be-printed is at least one of (i) a byte size that exceeds a memory capacity of the third party mobile terminal, (ii) a document that includes image data, and (iii) a dimension that exceeds a display window size of the third party mobile terminal when the document-to-be-printed is at one-hundred percent scale.

* * * * *